US011740984B1

(12) United States Patent
Tezak et al.

(10) Patent No.: US 11,740,984 B1
(45) Date of Patent: *Aug. 29, 2023

(54) TESTING HARDWARE IN A QUANTUM COMPUTING SYSTEM

(71) Applicant: Rigetti & Co, LLC, Berkeley, CA (US)

(72) Inventors: Nikolas Anton Tezak, Oakland, CA (US); Matthew J. Reagor, Corte Madera, CA (US); Christopher Butler Osborn, Oakland, CA (US); Alexa Nitzan Staley, San Francisco, CA (US)

(73) Assignee: Rigetti & Co, LLC, Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/121,150

(22) Filed: Dec. 14, 2020

Related U.S. Application Data

(63) Continuation of application No. 16/211,605, filed on Dec. 6, 2018, now Pat. No. 10,872,021.

(60) Provisional application No. 62/595,432, filed on Dec. 6, 2017.

(51) Int. Cl.
*G06F 11/263* (2006.01)
*G06F 11/273* (2006.01)
*G06N 10/00* (2022.01)

(52) U.S. Cl.
CPC ........... *G06F 11/273* (2013.01); *G06N 10/00* (2019.01)

(58) Field of Classification Search
CPC ...... G06F 11/079; G06F 11/273; G06N 10/00
USPC .......................................................... 714/37
See application file for complete search history.

(56) References Cited

U.S. PATENT DOCUMENTS

| 8,631,367 | B2 | 1/2014 | Pesetski et al. | |
| 8,832,165 | B2* | 9/2014 | Allen | B82Y 10/00 708/200 |
| 9,762,262 | B2 | 9/2017 | Ashikhmin | |
| 10,872,021 | B1 | 12/2020 | Tezak et al. | |
| 2003/0121028 | A1* | 6/2003 | Coury | B82Y 10/00 717/138 |
| 2006/0224547 | A1* | 10/2006 | Ulyanov | B82Y 10/00 706/62 |
| 2009/0259905 | A1 | 10/2009 | Silva et al. | |
| 2011/0238378 | A1 | 9/2011 | Allen et al. | |
| 2015/0006443 | A1* | 1/2015 | Rose | G06N 20/00 706/12 |
| 2016/0292586 | A1 | 10/2016 | Rigetti et al. | |
| 2016/0321559 | A1 | 11/2016 | Rose | |
| 2018/0144262 | A1 | 5/2018 | Roetteler et al. | |

(Continued)

OTHER PUBLICATIONS

USPTO, Notice of Allowance dated Aug. 6, 2020, in U.S. Appl. No. 16/211,605, 15 pgs.

(Continued)

*Primary Examiner* — Chae M Ko
(74) *Attorney, Agent, or Firm* — Henry Patent Law Firm PLLC

(57) ABSTRACT

In a general aspect, quantum computing system performance is tested. Systems and methods for testing hardware in a quantum computing system are described. The methods may include certification/decertification of data produced by the quantum computing system, detection of faults, correction of errors and/or recalibration/replacement of the quantum computing system or a quantum computing subsystem.

23 Claims, 2 Drawing Sheets

(56) References Cited

U.S. PATENT DOCUMENTS

| | | |
|---|---|---|
| 2018/0260245 A1 | 9/2018 | Smith |
| 2018/0260732 A1 | 9/2018 | Bloom et al. |
| 2018/0365585 A1 | 12/2018 | Smith et al. |
| 2019/0180197 A1 | 6/2019 | Granade et al. |
| 2020/0104739 A1 | 4/2020 | Sharma et al. |

OTHER PUBLICATIONS

Blume-Kohout, et al., "Robust, self-consistent, closed-form tomography of quantum logic gates on a trapped ion qubit", arXiv:1310.4492v1 [quant-ph], Oct. 16, 2013, 14 pgs.

Chuang, et al., "Prescription for experimental determination of the dynamics of a quantum black box", arXiv:quant-oh/9610001v1, Oct. 1, 1996, 6 pgs.

DiCarlo, et al., "Preparation and Measurement of Three-Qubit Entanglement in a Superconducting Circuit", arXiv:1004.4324v1 [cond-mat.mes-hall], Apr. 25, 2010, 9 pgs.

Dolde, et al., "High Fidelity Spin Entanglement Using Optimal Control", arXiv:1309.4430, Sep. 17, 2013, 16 pgs.

Henry, et al., "Signatures of incoherence in a quantum information processor", arXiv:0705.3666v2 [quant-ph], Aug. 21, 2007, 15 pgs.

Hincks, et al., "Accounting for Classical Hardware in the Control of Quantum Devices", arXiv:1409.8178v1 [quant-ph], Sep. 29, 2014, 18 pgs.

Jerger, et al., "In situ characterization of qubit control lines: a qubit as a vector network analyzer", arXiv:1706.05829v1 [quant-ph], Jun. 19, 2017, 5 pgs.

Knill, et al., "Randomized Benchmarking of Quantum Gates", arXiv:0707.0963v1 [quant-ph], Jul. 6, 2007, 13 pgs.

Reed, Matthew D., "Entanglement and Quantum Error Correction with Superconducting Qubits", arXiv:1311.6759v1, Nov. 26, 2013, 368 pgs.

* cited by examiner

TESTING HARDWARE IN A QUANTUM COMPUTING SYSTEM

CROSS-REFERENCE TO RELATED APPLICATIONS

This application is a continuation of U.S. application Ser. No. 16/211,605, filed Dec. 6, 2018, entitled "Testing Hardware in a Quantum Computing System." which claims priority to U.S. Provisional Application Ser. No. 62/595,432 entitled "Testing Hardware in a Quantum Computing System" and filed on Dec. 6, 2017. The priority applications are incorporated herein by reference.

BACKGROUND

The following description relates to testing hardware in a quantum computing system.

Quantum computing systems include components that are sensitive to operating conditions. A quantum processor and its associated control systems may be subject to various sources of noise that can introduce errors in computations. Thus, quantum computing systems typically require extensive measurement and calibration procedures to initialize the system for operation.

DETAILED DESCRIPTION

Figure 1:
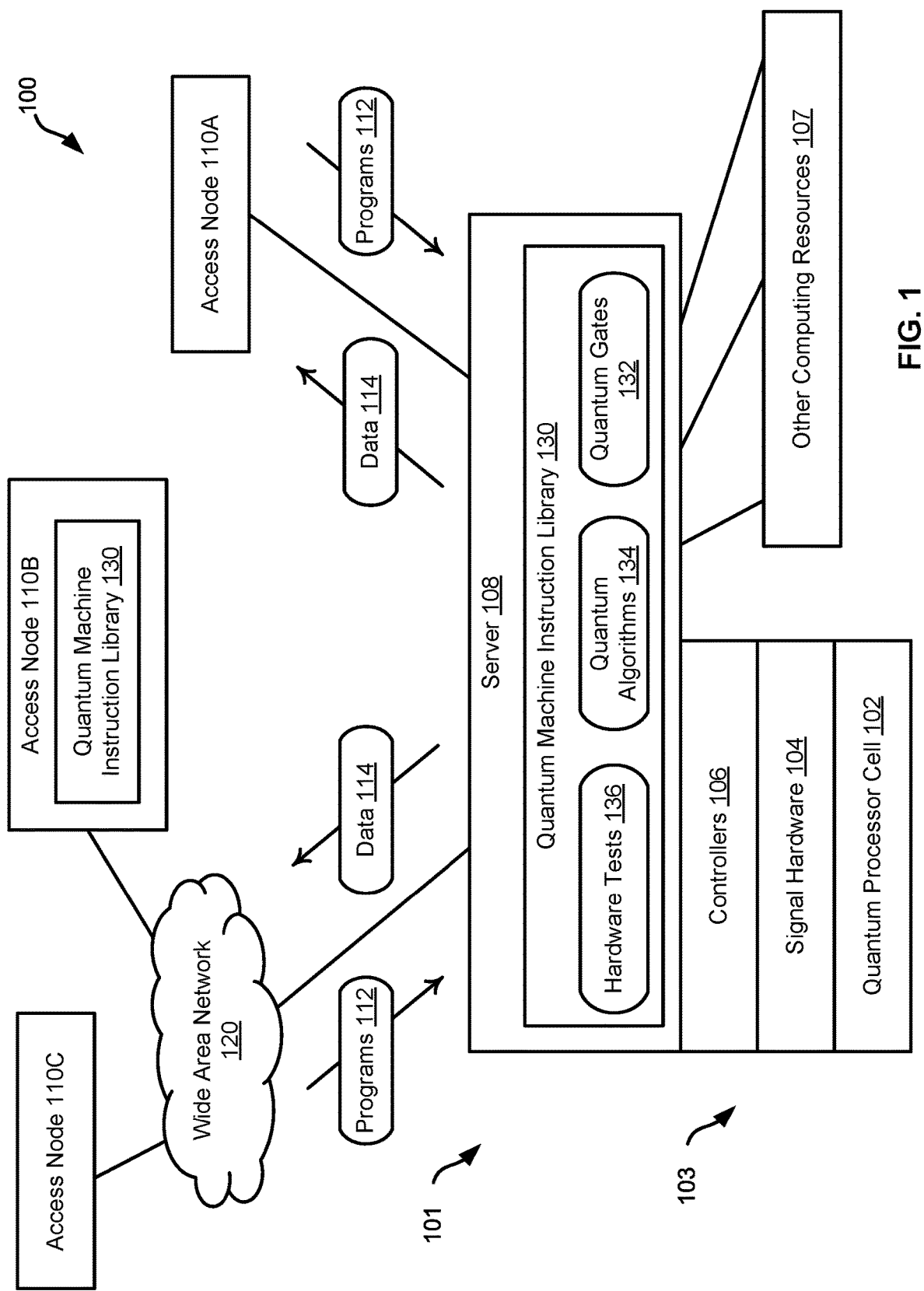
FIG. 1 is a block diagram of an example computing system.

In some aspects of what is described here, hardware subsystems and components in a quantum computing system are evaluated using a testing procedure. In some cases, the testing procedures can detect a broad range of noise or malfunctions including, for example, intermittent failures that do not necessarily show up in tests or calibration procedures executed before system deployment. In some cases, testing procedures advantageously exploit multi-qubit entangled states, for example, to verify that control system hardware can reliably detect the correlations of multi-qubit measurements with sufficient accuracy and precision, which is necessary (at least in some cases) for quantum computing applications that rely on sampling the distribution of multi-qubit observables. By including variants that prepare (maximally) entangled states with different known readout statistics, testing procedures can also be used to verify that entangling operations remain well calibrated.

In some implementations, a computing environment can include a library or other compilation of hardware tests that can be easily accessed, configured, or utilized by end users and system managers as well as automated calibration and monitoring systems. For example, the computing environment could expose an application programming interface (API) or similar mechanism that allows programmers to define their own check circuits and provide customized decision functions for labeling a given check a success or failure. Alternatively, the computing environment may allow programs to sample check circuits at a time when a particular computing resource is known to be correctly functioning (e.g., based on other tests) and store outcome histograms, for example, to be used in statistical tests against the initial data when a check circuit is re-executed later.

The testing procedures and other techniques described here can provide technical advantages in a quantum computing system or a computing environment that includes quantum computing resources. For example, in some cases, testing procedures can be applied in situ, interleaved with quantum programs as a verification step to ensure that the statistics produced in subsequent measurements are reliable. As another example, the testing procedures described here can provide a faster way to verify system functionality, for example, compared to running a full or even partial gate set tomography, and the testing procedure can scale efficiently to arbitrarily sized systems. In addition, a testing procedure, as well as evaluation criteria and performance metrics based on the testing procedure, can be defined in a hardware-independent form, or in another form that can be applied to a broad class of quantum computing resources. For example, some testing procedures can be applied generally to any quantum processor unit that has physically distinct readout subsystems for different individual qubits or groups of qubits.

The testing procedures and other techniques described here can provide additional technical advantages that create an improved user experience, for instance, in a cloud-based or other remotely-accessed computing system. For example, when testing procedures can be invoked by remote users of a computing system, the test results can provide users a higher degree of confidence in the output data provided by the computing system. In some cases, testing procedures can be directly invoked by users (e.g., in programs submitted by the users) to authenticate system performance according to the user's specific criteria. For instance, a computing system can expose application programming interfaces (APIs) or another type of instruction library resource to users of the computing system.

The testing procedures and other techniques described here can provide additional technical advantages that improve automated system monitoring and maintenance capabilities, for instance, in a cloud-based or other remotely-accessed computing system. For example, when a quantum processor is deployed to execute jobs submitted over the cloud, the system can provide consistent recalibration of the control waveforms in addition to checks that certify correct operation of the complete quantum processor including its control system. These checks could be interleaved or sometimes even run in parallel with user-submitted quantum computing programs to certify the correctness of specific sequences of data generated from the user-submitted programs. Furthermore, in case of a failure, these checks may allow specific parts of the control system to be identified as the source of fault. In addition, such system monitoring capabilities can be exposed through an API or other interface, to allow users to schedule the same types of verifications.

In some implementations, testing procedures are deployed in a quantum processor for which a well calibrated physical model exists; for instance, the physical model may predict the effect that certain control sequences will have on the output state of the quantum processor and how that effect will be manifested in readout data. In some implementations, testing procedures can be deployed in a quantum processor for which a well calibrated physical model does not exist.

In some examples, testing procedures utilize properties of entangled states in a quantum processor to detect and evaluate failures in the classical hardware components that control the quantum processor or other types of control system failures. For example, if quantum state measurement correlations do not correspond to the entangled state properties (e.g., within some statistical tolerance), the quantum state measurement correlations may indicate readout system failure or other faults. Testing procedures may use other types of protocols in some cases. For example, repeated Ramsey measurements may allow the detection of changes in the electromagnetic environment of a quantum processor that lead to shifts of qubit transition frequencies or decreased coherence times. For example, ground loops in the flux bias control chain can lead to an enhanced system sensitivity to magnetic field fluctuations even outside of the cryostats. Certain measurement protocols allow using qubit response as a means of measuring the full transfer function from room temperature electronics to the quantum processor. In some fault detection protocols, these measurements may be periodically repeated to detect failures in any element along these signal paths.

FIG. 1 is a block diagram of an example computing system 100. The example computing system 100 shown in FIG. 1 includes a computing environment 101 and access nodes 110A, 110B, 110C. A computing system may include additional or different features, and the components of a computing system may operate as described with respect to FIG. 1 or in another manner.

The example computing environment 101 includes computing resources and exposes their functionality to the access nodes 110A, 110B, 110C (referred to collectively as "access nodes 110"). The computing environment 101 shown in FIG. 1 includes a server 108, a quantum processor unit 103 and other computing resources 107. The computing environment 101 may also include one or more of the access nodes (e.g., the example access node 110A) and other features and components. A computing environment may include additional or different features, and the components of a computing environment may operate as described with respect to FIG. 1 or in another manner.

The example computing environment 101 can provide services to the access nodes 110, for example, as a cloud-based or remote-accessed computer, as a distributed computing resource, as a supercomputer or another type of high-performance computing resource, or in another manner. As shown in FIG. 1, to access computing resources of the computing environment 101, the access nodes 110 send programs 112 to the server 108 and in response, the access nodes 110 receive data 114 from the server 108. The access nodes 110 may access services of the computing environment 101 in another manner, and the server 108 or other components of the computing environment 101 may expose computing resources in another manner.

Any of the access nodes 110 can operate local to, or remote from, the server 108 or other components of the computing environment 101. In the example shown in FIG. 1, the access node 110A has a local data connection to the server 108 and communicates directly with the server 108 through the local data connection. The local data connection can be implemented, for instance, as a wireless Local Area Network, an Ethernet connection, or another type of wired or wireless connection. Or in some cases, a local access node can be integrated with the server 108 or other components of the computing environment 101. Generally, the computing system 100 can include any number of local access nodes.

In the example shown in FIG. 1, the access nodes 110B, 110C each have a remote data connection to the server 108, and each communicates with the server 108 through the remote data connection. The remote data connection in FIG. 1 is provided by a wide area network 120, such as, for example, the Internet or another type of wide area communication network. In some cases, remote access nodes use another type of remote data connection (e.g., satellite-based connections, a cellular network, a private network, etc.) to access the server 108. Generally, the computing system 100 can include any number of remote access nodes.

The example server 108 shown in FIG. 1 communicates with the access nodes 110 and the computing resources in the computing environment 101. For example, the server 108 can delegate computational tasks to the quantum processor unit 103 and the other computing resources 107, and the server 108 can receive the output data from the computational tasks performed by the quantum processor unit 103 and the other computing resources 107. In some implementations, the server 108 includes a personal computing device, a computer cluster, one or more servers, databases, networks, or other types of classical or quantum computing equipment. The server 108 may include additional or different features and may operate as described with respect to FIG. 1 or in another manner.

The example quantum processor unit 103 operates as a quantum computing resource in the computing environment 101. The other computing resources 107 may include additional quantum computing resources (e.g., quantum processor units, quantum virtual machines or quantum simulators) as well as classical (non-quantum) computing resources such as, for example, digital microprocessors, specialized co-processor units (e.g., graphics processing units (GPUs), cryptographic co-processors, etc.), special purpose logic circuitry (e.g., field programmable gate arrays (FPGAs), application-specific integrated circuits (ASICs), etc.), systems-on-chips (SoCs), etc., or combinations of these and other types of computing modules.

In some implementations, the server 108 generates computing jobs, identifies an appropriate computing resource in the computing environment 101 to execute the computing job, and sends the computing job to the identified resource for execution. For example, the server 108 may send a computing job to the quantum processor unit 103 or any of the other computing resources 107. A computing job can be formatted, for example, as a computer program, function, code or other type of computer instruction set. Each computing job includes instructions that, when executed by an appropriate computing resource, perform a computational task and generate output data based on input data. For example, a computing job can include instructions formatted for a quantum processor unit, a quantum virtual machine, a digital microprocessor, co-processor or other classical data processing apparatus, or another type of computing resource.

In some implementations, the server 108 operates as a host system for the computing environment 101. For example, the access nodes 110 may send programs 112 to server 108 for execution in the computing environment 101. The server 108 can store the programs 112 in a program queue, generate one or more computing jobs for executing the programs 112, generate a schedule for the computing jobs, allocate computing resources in the computing environment 101 according to the schedule, and delegate the computing jobs to the allocated computing resources. The server 108 can receive, from each computing resource, output data from the execution of each computing job. Based on the output data, the server 108 may generate additional computing jobs, generate data 114 that is provided back to an access node 110, or perform another type of action.

In some implementations, all or part of the computing environment 101 operates as a cloud-based quantum computing (QC) environment, and the server 108 operates as a host system for the cloud-based QC environment. For example, the programs 112 can be formatted as quantum computing programs for execution by one or more quantum processor units. The server 108 can allocate quantum computing resources (e.g., one or more QPUs, one or more quantum virtual machines, etc.) in the cloud-based QC environment according to the schedule, and delegate quantum computing jobs to the allocated quantum computing resources for execution.

In some implementations, all or part of the computing environment 101 operates as a hybrid computing environment, and the server 108 operates as a host system for the hybrid environment. For example, the programs 112 can be formatted as hybrid computing programs, which include instructions for execution by one or more quantum processor units and instructions that can be executed by another type of computing resource. The server 108 can allocate quantum computing resources (e.g., one or more QPUs, one or more quantum virtual machines, etc.) and other computing resources in the hybrid computing environment according to the schedule, and delegate computing jobs to the allocated computing resources for execution. The other (non-quantum) computing resources in the hybrid environment may include, for example, one or more digital microprocessors, one or more specialized co-processor units (e.g., graphics processing units (GPUs), cryptographic co-processors, etc.), special purpose logic circuitry (e.g., field programmable gate arrays (FPGAs), application-specific integrated circuits (ASICs), etc.), systems-on-chips (SoCs), or other types of computing modules.

In some cases, the server 108 can select the type of computing resource (e.g., quantum or otherwise) to execute an individual computing job in the computing environment 101. For example, the server 108 may select a particular QPU or other computing resource based on availability of the resource, speed of the resource, information or state capacity of the resource, a performance metric (e.g., process fidelity) of the resource, or based on a combination of these and other factors. In some cases, the server 108 can perform load balancing, resource testing and calibration, and other types of operations to improve or optimize computing performance.

The example server 108 shown in FIG. 1 includes a quantum machine instruction library 130. The quantum machine instruction library 130 includes instruction sets that the server 108 uses to produce quantum computing jobs to be executed by quantum computing resources in the computing environment 101 (e.g., by the quantum processor unit 103). The example quantum machine instruction library 130 shown in FIG. 1 includes hardware tests 136, quantum algorithms 134 and quantum gates 132. The quantum machine instruction library 130 may include additional or different instruction sets or other resources.

The example quantum gates 132 include instructions for quantum logic gates that can be executed in the computing environment 101. For example, the quantum gates 132 may include a full set of quantum logic gates available for execution by the quantum processor unit (QPU) 103 or another quantum computing resource. The instructions included in the quantum gates 132 can be defined in a device-independent instruction format, a hardware-specific instruction format, or otherwise. The quantum logic gates may include, for example, single-qubit quantum logic gates (e.g., "NOT" gates, "PHASE" gates, "Hadamard" gates, etc.), two-qubit quantum logic gates (e.g., "Controlled-NOT" gates, "Controlled-PHASE" gates, "Bell-Rabi" gates, "SWAP" gates, etc.), and multi-qubit gates for three or more qubits. In some cases, the quantum gates 132 in the quantum machine instruction library 130 include instructions for converting among equivalent quantum logic gate sets, condensing or optimizing quantum logic gate sets, or other types of quantum logic gate synthesis operations.

The example quantum algorithms 134 include instructions for one or more quantum algorithms that can be executed in the computing environment 101. For example, the quantum algorithms 134 may include quantum computing tasks that can be executed by the QPU 103 or another quantum computing resource. The instructions included in the quantum algorithms 134 can be defined in a device-independent instruction format, a hardware-specific instruction format, or otherwise. The quantum algorithms 134 may include, for example, instructions for performing simulations of quantum systems, quantum Fourier transforms, quantum error correcting codes, quantum search algorithms, quantum factoring algorithms, and other types of quantum computing algorithms. In some cases, one or more of the quantum algorithms 134 includes, or includes a reference to, one or more of the quantum gates 132. In some cases, quantum algorithms can be described or represented, for example, as a Hamiltonian, as a list of unitary operations, as a superoperator, as a matrix, as a quantum logic circuit, or otherwise.

The example hardware tests 136 include instructions for one or more test procedures for a quantum processor unit or another quantum computing resource. The test procedures can be designed, for example, to detect, diagnose or evaluate noise or faults affecting the controllers 106, the signal hardware 104, the quantum processor cell 102 or other components or subsystems in a quantum processor unit. The hardware tests 136 may include the example process 200 shown in FIG. 2 or another type of testing procedure. The instructions included in the hardware tests 136 can be defined in a device-independent instruction format, a hardware-specific instruction format, or otherwise. In some cases, one or more of the hardware tests 136 includes, or includes a reference to, one or more of the quantum gates 132 or quantum algorithms 134.

In some implementations, one or more of the hardware tests 136 uses a verified QPU to calibrate and test classical control systems associated with the QPU. In some cases, the initialization process for the QPU requires only single qubit statistics, and the hardware tests 136 may include further testing procedures that evaluate multi-qubit statistics. For example, multi-qubit gates can often be calibrated through population transfer measurements that do not rely on direct observation of entanglement at the single shot level, and in such cases, a further testing procedure can be used to test multi-qubit state correlations based on direct observations of entangled states. Accordingly, the testing procedures may be used in the QPU 103 to detect instrumentation errors that corrupt the single-shot correlations in situ (e.g., when the signal hardware 104 and controllers 106 are fully connected to operate the quantum processor cell 102).

The quantum machine instruction library 130 can include a file structure, naming convention, or other system that allows the resources in the quantum machine instruction library 130 to be invoked by the programs 112. For instance, the server 108 or the computing environment 101 can expose the quantum machine instruction library 130 to the access nodes 110 as a set of application programming interfaces (APIs). The resources in the quantum machine instruction library 130 may be utilized by the access nodes 110 in another manner. Accordingly, the programs 112 that are produced by the access nodes 110 and delivered to the server 108 may include information that invokes the quantum machine instruction library 130. For example, the programs 112 may invoke hardware tests 136, quantum algorithms 134, quantum gates 132, etc.

In some implementations, one or more of the access nodes 110 includes a quantum machine instruction library, which may be similar to the example quantum machine instruction library 130 shown in FIG. 1. For instance, the access node 110B in FIG. 1 includes a local version of the quantum machine instruction library 130. The quantum machine instruction library 130 stored at the access node 110B can include the quantum gates 132, the quantum algorithms 134, the hardware tests 136, or any combination of these and other types of instruction sets. Accordingly, the programs 112 that are produced by the access node 110B and delivered to the server 108 may include instruction sets from the quantum machine instruction library 130. For example, the programs 112 may include hardware tests, quantum algorithms, quantum gates, etc.

The example quantum processor unit 103 shown in FIG. 1 can perform quantum computational tasks by executing quantum algorithms. In some implementations, the quantum processor unit 103 can perform quantum computation by storing and manipulating information within individual quantum states of a composite quantum system. For example, qubits (i.e., quantum bits) can be stored in and represented by an effective two-level sub-manifold of a quantum coherent physical system. In some instances, quantum logic can be executed in a manner that allows large-scale entanglement within the quantum system. Control signals can manipulate the quantum states of individual qubits and the joint states of multiple qubits. In some instances, information can be read out from the composite quantum system by measuring the quantum states of the qubits. In some implementations, the quantum states of the qubits are read out by measuring the transmitted or reflected signal from auxiliary quantum devices that are coupled to individual qubits.

In some implementations, the quantum processor unit 103 can operate using gate-based models for quantum computing. For example, the qubits can be initialized in an initial state, and a quantum logic circuit comprised of a series of quantum logic gates can be applied to transform the qubits and extract measurements representing the output of the quantum computation. In some implementations, the quantum processor unit 103 can operate using adiabatic or annealing models for quantum computing. For instance, the qubits can be initialized in an initial state, and the controlling Hamiltonian can be transformed adiabatically by adjusting control parameters to another state that can be measured to obtain an output of the quantum computation.

In some models, fault-tolerance can be achieved by applying a set of high-fidelity control and measurement operations to the qubits. For example, quantum error correcting schemes can be deployed to achieve fault-tolerant quantum computation, or other computational regimes may be used. Pairs of qubits can be addressed, for example, with two-qubit logic operations that are capable of generating entanglement, independent of other pairs of qubits. In some implementations, more than two qubits can be addressed, for example, with multi-qubit quantum logic operations capable of generating multi-qubit entanglement. In some implementations, the quantum processor unit 103 is constructed and operated according to a scalable quantum computing architecture. For example, in some cases, the architecture can be scaled to a large number of qubits to achieve large-scale general purpose coherent quantum computing.

The example quantum processor unit 103 shown in FIG. 1 includes controllers 106, signal hardware 104, and a quantum processor cell 102. A quantum processor unit may include additional or different features, and the components of a quantum processor unit may operate as described with respect to FIG. 1 or in another manner.

In some instances, all or part of the quantum processor cell 102 functions as a quantum processor, a quantum memory, or another type of subsystem. In some examples, the quantum processor cell 102 includes a quantum circuit system. The quantum circuit system may include qubit devices, resonator devices and possibly other devices that are used to store and process quantum information. In some cases, the quantum processor cell 102 includes a superconducting circuit, and the qubit devices are implemented as circuit devices that include Josephson junctions, for example, in superconducting quantum interference device (SQUID) loops or other arrangements, and are controlled by radio-frequency signals, microwave signals, and bias signals delivered to the quantum processor cell 102. In some cases, the quantum processor cell 102 includes an ion trap system, and the qubit devices are implemented as trapped ions controlled by optical signals delivered to the quantum processor cell 102. In some cases, the quantum processor cell 102 includes a spin system, and the qubit devices are implemented as nuclear or electron spins controlled by microwave or radio-frequency signals delivered to the quantum processor cell 102. The quantum processor cell 102 may be implemented based on another physical modality of quantum computing.

In some implementations, the example quantum processor cell 102 can process quantum information by applying control signals to the qubits in the quantum processor cell 102. The control signals can be configured to encode information in the qubits, to process the information by performing quantum logic gates or other types of operations, or to extract information from the qubits. In some examples, the operations can be expressed as single-qubit logic gates, two-qubit logic gates, or other types of quantum logic gates that operate on one or more qubits. A sequence of quantum logic operations can be applied to the qubits to perform a quantum algorithm. The quantum algorithm may correspond to a computational task, a hardware test, a quantum error correction procedure, a quantum state distillation procedure, or a combination of these and other types of operations.

The example signal hardware 104 includes components that communicate with the quantum processor cell 102. The signal hardware 104 may include, for example, waveform generators, amplifiers, digitizers, high-frequency sources, DC sources, AC sources, and other types of components. The signal hardware may include additional or different features and components. In the example shown, components of the signal hardware 104 are adapted to interact with the quantum processor cell 102. For example, the signal hardware 104 can be configured to operate in a particular frequency range, configured to generate and process signals in a particular format, or the hardware may be adapted in another manner.

In some instances, one or more components of the signal hardware 104 generate control signals, for example, based on control information from the controllers 106. The control signals can be delivered to the quantum processor cell 102 to operate the quantum processor unit 103. For instance, the signal hardware 104 may generate signals to implement quantum logic operations, readout operations or other types of operations. As an example, the signal hardware 104 may include arbitrary waveform generators (AWGs) that generate electromagnetic waveforms (e.g., microwave or radio-frequency) or laser systems that generate optical waveforms. The waveforms or other types of signals generated by the signal hardware 104 can be delivered to devices in the quantum processor cell 102 to operate qubit devices, readout devices, bias devices, coupler devices or other types of components in the quantum processor cell 102.

In some instances, the signal hardware 104 receives and processes signals from the quantum processor cell 102. The received signals can be generated by operation of the quantum processor unit 103. For instance, the signal hardware 104 may receive signals from the devices in the quantum processor cell 102 in response to readout or other operations performed by the quantum processor cell 102. Signals received from the quantum processor cell 102 can be mixed, digitized, filtered, or otherwise processed by the signal hardware 104 to extract information, and the information extracted can be provided to the controllers 106 or handled in another manner. In some examples, the signal hardware 104 may include a digitizer that digitizes electromagnetic waveforms (e.g., microwave or radio-frequency) or optical signals, and a digitized waveform can be delivered to the controllers 106 or to other signal hardware components. In some instances, the controllers 106 process the information from the signal hardware 104 and provide feedback to the signal hardware 104; based on the feedback, the signal hardware 104 can in turn generate new control signals that are delivered to the quantum processor cell 102.

In some implementations, the signal hardware 104 includes signal delivery hardware that interface with the quantum processor cell 102. For example, the signal hardware 104 may include filters, attenuators, directional couplers, multiplexers, diplexers, bias components, signal channels, isolators, amplifiers, power dividers and other types of components. In some instances, the signal delivery hardware performs preprocessing, signal conditioning, or other operations to the control signals to be delivered to the quantum processor cell 102. In some instances, signal delivery hardware performs preprocessing, signal conditioning or other operations on readout signals received from the quantum processor cell 102.

The example controllers 106 communicate with the signal hardware 104 to control operation of the quantum processor unit 103. The controllers 106 may include digital computing hardware that directly interfaces with components of the signal hardware 104. The example controllers 106 may include processors, memory, clocks and other types of systems or subsystems. The processors may include one or more single or multi-core microprocessors, digital electronic controllers, special purpose logic circuitry, e.g., an FPGA (field programmable gate array) or an ASIC (application specific integrated circuit), or other types of data processing apparatus. The memory may include any type of volatile or non-volatile memory, a digital or quantum memory, or another type of computer storage medium. The controllers 106 may include additional or different features and components.

In some implementations, the controllers 106 include memory or other components that store quantum state information, for example, based on qubit readout operations performed by the quantum processor unit 103. For instance, the states of one or more qubits in the quantum processor cell 102 can be measured by qubit readout operations, and the measured state information can be stored in a cache or other type of memory system in one or more of the controllers 106. In some cases, the measured state information is used in the execution of a quantum algorithm, a quantum error correction procedure, a quantum processor unit (QPU) calibration or testing procedure, or another type of quantum process.

In some implementations, the controllers 106 include memory or other components that store quantum machine instructions, for example, representing a quantum program for execution by the quantum processor unit 103. In some cases, the quantum machine instructions are received from the server 108 in a hardware-independent format. For example, quantum machine instructions may be provided in a quantum instruction language such as Quil, described in the publication "A Practical Quantum Instruction Set Architecture," arXiv:1608.03355v2, dated Feb. 17, 2017, or another quantum instruction language. For instance, the quantum machine instructions may be written in a format that can be executed by broad range of quantum processor units or quantum virtual machines.

In some instances, the controllers 106 can interpret the quantum machine instructions and generate hardware-specific control sequences configured to execute the operations proscribed by the quantum machine instructions. For example, the controllers 106 may generate control information that is delivered to the signal hardware 104 and converted to control signals that control the quantum processor cell 102.

In some implementations, the controllers 106 include one or more clocks that control the timing of operations. For example, operations performed by the controllers 106 may be scheduled for execution over a series of clock cycles, and clock signals from one or more clocks can be used to control the relative timing of each operation or groups of operations. In some cases, the controllers 106 schedule control operations according to quantum machine instructions in a quantum computing program, and the control information is delivered to the signal hardware 104 according to the schedule in response to clock signals from a clock or other timing system.

In some implementations, the controllers 106 include processors or other components that execute computer program instructions (e.g., instructions formatted as software, firmware, or otherwise). For example, the controllers 106 may execute a quantum processor unit (QPU) driver software, which may include machine code compiled from any type of programming language (e.g., Python, C++, etc.) or instructions in another format. In some cases, QPU driver software receives quantum machine instructions (e.g., based on information from the server 108) and quantum state information (e.g., based on information from the signal hardware 104), and generates control sequences for the quantum processor unit 103 based on the quantum machine instructions and quantum state information.

In some instances, the controllers 106 generate control information (e.g., a digital waveform) that is delivered to the signal hardware 104 and converted to control signals (e.g., analog waveforms) for delivery to the quantum processor cell 102. The digital control information can be generated based on quantum machine instructions, for example, to execute quantum logic operations, readout operations, or other types of control.

In some instances, the controllers 106 extract qubit state information from qubit readout signals, for example, to identify the quantum states of qubits in the quantum processor cell 102 or for other purposes. For example, the controllers may receive the qubit readout signals (e.g., in the form of analog waveforms) from the signal hardware 104, digitize the qubit readout signals, and extract qubit state information from the digitized signals.

In some aspects of operation, the QPU 103 is deployed for active operation in the computing environment 101. For example, the QPU 103 can be deployed after an initialization and calibration procedure, with known gate and readout fidelities. In its deployed status, the QPU actively executes computing jobs, for example, based on programs 112 submitted by access nodes 110. In some instances, the server 108 or one of the access nodes 110 can use one or more of the hardware tests 136 to verify the overall integrity of the QPU 103 during its deployment. For example, a program 112 may rely on the accuracy of results obtained by averaging over many executions of a particular instruction set, and the program 112 may test for system failures over the time period required for execution.

In some cases, the hardware tests 136 provide a mechanism that allows the server 108 or an access node 110 to interleave special routines or modify programs 112 to add check functionality (e.g., on unused qubit resources) inside the programs 112. These check programs can be configured such that their resulting outcome distributions should be predictable. When the checks are executed and substantial deviations from the predictions occur, the QPU 103 or the server 108 can produce a signal or alert indicating, for example, that the QPU 103 has detected a fault and that results obtained since the last successfully passed check are unreliable. Furthermore, a failed check can trigger the execution of specific further checks that allow the server 108 to pinpoint where exactly in the system the fault occurred. For example, in some embodiments of classical control hardware there are multiple parallel channels for signals to travel to and from the quantum processor cell where each channel is associated with a specific subset of the qubits in the quantum processor cell; if one channel is faulty, testing of individual channels will allow the faulty channel to be identified, and the fault to be rectified. Additionally, the hardware tests 136 may expose an API that allows access nodes 110 to submit custom check circuits which, provided they can be simulated efficiently, can be applied sequentially or in parallel with their programs and can certify the correct function of the quantum processor. In some cases, after a check program is executed, a report is provided to an access node 110 or displayed to a user of an access node, and the report can contain results and data from the check program.

Figure 2:
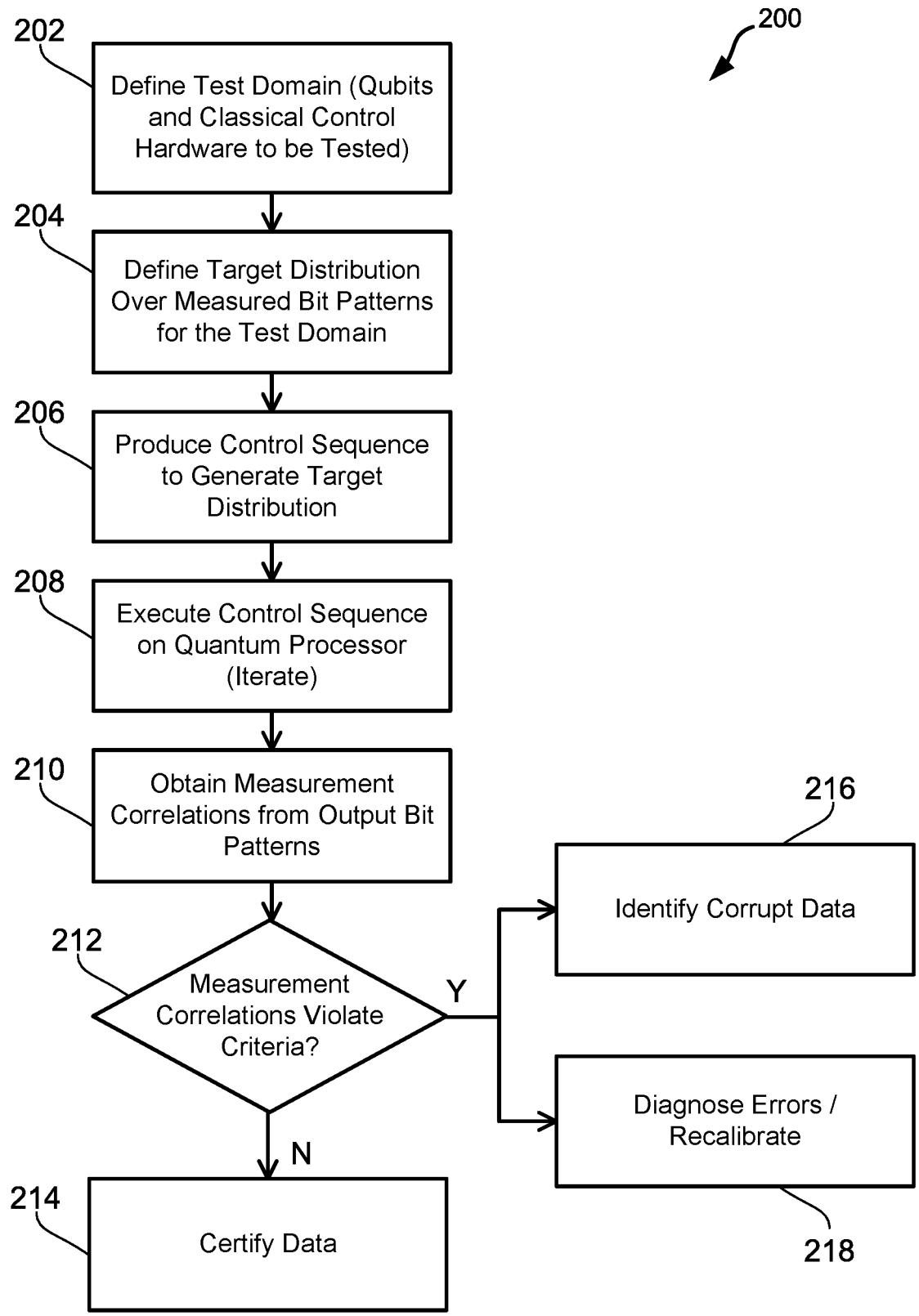
FIG. 2 is a flow chart showing an example process for testing a quantum computing system.

FIG. 2 is a flow chart showing an example process 200 for testing a quantum computing system. Operations in the example process 200 may be performed by a quantum processor unit (e.g., the QPU 103 in FIG. 1) or by another computer system or subsystem (e.g., the server 108 in FIG. 1) to evaluate the operation of a quantum processor unit. For instance, the process 200 may be performed by a control system (e.g., the controller 106 in FIG. 1) or another component of a QPU or by a host system that provides computing jobs to the QPU.

The example process 200 may include additional or different operations, and the operations may be performed in the order shown or in another order. In some cases, one or more of the operations shown in FIG. 2 are implemented as processes that include multiple operations, sub-processes or other types of routines. In some cases, operations can be combined, performed in another order, performed in parallel, iterated, or otherwise repeated or performed another manner.

In some implementations, all or part of the process 200 can be invoked by a control system of the QPU being tested, by a server or another type of host system that provides computing jobs to the QPU, by an access node (remote or local) that sends programs to the host system, or by another module of a computing environment. For example, the process 200 may be invoked through an application programming interface (API) provided in a cloud-based or other remote-accessed computing system. In the context of the example shown in FIG. 1, the process 200 may be executed as part of one or more hardware tests 136, for instance, in response to a command or other instruction in one of the programs 112, as part of systematic monitoring performed by the server 108, or in response to other instructions.

In a deployed QPU, qubit measurements obtained by executing a quantum algorithm generally sample outcomes from an a priori unknown statistical distribution, and the quantum algorithm must rely on the QPU's control hardware to provide representative samples of the statistical distributions. The statistical distributions are generally unknown because of the computational complexity of simulating quantum programs (which grows exponentially with the number of qubits). In some contexts, operating a QPU may require the ability to jointly record the outcomes of all qubits measured in individual executions of a quantum algorithm and thus collect samples over bit-strings and not just individual bits. This can be viewed in analogy to classical probability theory where, in the presence of linear correlations we have $<b_1 b_2> != <b_1><b_2>$; in other words, expectation values of products of variables in general do not simply factor over the variables because those variables may not be independent.

Check programs that can be efficiently simulated by a classical system can provide additional value for noise diagnostics. For general quantum programs that cannot be classically simulated, there exist equivalent programs that must have the same measurement statistics but are realized through different control signals. For example, equivalent programs can be obtained by introducing additional quantum logic gates in such a way that leaves the overall outcome the same or by permuting the assignment of qubits used in a program or a part of a program.

In some cases, noise or other faults that can produce errors in multi-qubit correlation measurements in a QPU can be detected by the example process 200, and the noise or other faults can then be addressed to improve operation of the QPU. For example, if a QPU is deployed and starts operating (e.g., running quantum computing jobs) in a nominally correct state, faults in the QPU's control system that lead to malfunction at some random later time can be detected by executing the process 200 while the QPU is deployed (e.g., while running quantum computing jobs, between running quantum computing jobs, otherwise). In some cases, these types of faults can be extremely difficult to detect by other techniques, for example, because they may only be manifest in corrupted multi-qubit correlations.

The example process 200 can be used to identify faults in a QPU, for example, so that systematic faults can be corrected or otherwise addressed. As an example, a QPU may have multiple receiver modules to capture measurements taken at particular times at a high rate of repetition, and in such systems, it is typically important that measured bits are assigned the correct global time throughout the readout processing chain that propagates these results back to a host system or access node. If an erroneous assignment occurs such that the measured data from different receivers does not correspond to a single execution of a quantum program, then they are sampled from different, independent outcomes and thus any correlation may be erased. In such cases, the process 200 can be used to identify faults that caused the erroneous assignment, so that the faults can be repaired or otherwise addressed.

In some implementations, a family of check measurements can be provided by the example process 200, to allow detecting the types of errors mentioned above as well as other types of errors. Furthermore, in some contexts, successfully passing such a check may provide a degree of assurance that the QPU is functioning correctly.

At 202, a test domain, which includes a set of qubits and corresponding classical control hardware to be tested in a QPU, is defined. For example, the test domain can include all the qubits in a quantum processor cell and corresponding classical control hardware (e.g., in the quantum processor cell 102 and controllers 106 in FIG. 1, or in another type of quantum processor cell). In some cases, the test domain includes less than all the qubits in a quantum processor cell and corresponding classical control hardware. For example, the test domain may include the subset of qubits that are not being used in a quantum algorithm, or another subset of the qubits in a QPU.

At 204, a target entangled state, or, more generally, target distribution over measured bit patterns, is defined for the test domain. In some cases, the target entangled state is a maximally entangled state for the test domain. For example, the target entangled state can be a Greenberger-Horne-Zeilinger (GHZ)-type state over some or all of the qubits of the QPU. In some embodiments, the target distribution allows for performing Bell tests of the qubits in the test domain.

Any appropriate measure of entanglement (e.g., the entanglement entropy or another measure) can be used to determine whether a particular quantum state is an entangled state. A GHZ-type state is an example of an entangled state, for any number of qubits, of the form $(|00\ldots0\rangle + |11\ldots1\rangle)/\sqrt{2}$. A GHZ-type state may be fully entangled for all participating qubits and can be prepared by a relatively simple quantum logic circuit.

At 206, a control sequence, which is configured to generate the target entangled state, is produced. The control sequence can include, for example, digital control information that is delivered to classical control hardware for execution. For instance, the control sequence can be or include the type of information that is passed from the controllers 106 to the signal hardware 104 in the example QPU 103 shown in FIG. 1. The control sequence can be configured to generate the target entangled state over the test domain identified at 202.

At 208, the control sequence is executed iteratively on the QPU. Each execution of the control sequence produces an output state in the test domain of the quantum processor, and measurements of the output state can be obtained. For example, measurements of the output state, or, more generally, output of bit patterns, may be obtained by measuring one or more of the qubits in the test domain. In some cases, a single execution of the control sequence may provide useful measurements where the control sequence comprises collection of sufficient sequential measurements of the output state in a single execution.

To iteratively execute the control sequence, the control system for the QPU may repeatedly deliver the control sequence to the control hardware for execution. For example, in the example shown in FIG. 1, the controllers 106 may iteratively deliver the control sequence to the signal hardware 104, in order to iteratively produce output states in the test domain of the quantum processor cell 102. Before each execution, the qubits in the quantum processor can be reset to an initial state. For instance, the quantum processor may be reset to the $|00\ldots0\rangle$ state or another quantum state. In the ideal case, the output states produced by the control sequence are all identical to the target entangled state. However, noise or faults in the QPU may produce errors in the output states, such that the output states are produced with less than 100% fidelity.

At 210, measurement correlations are obtained from the output states. Furthermore, figures of merit can be obtained, for example, by comparing the correlations of the output bit patterns with the correlations of an ideally prepared target distribution. In some embodiments the quantum state or process fidelity between an ideal state or process and one estimated from output bit patterns may be taken as a figure of merit.

For an ideal preparation and measurement of a GHZ-type state, the only possible measurement outcomes for a particular iteration should be the bit strings 00 . . . 0 and 11 . . . 1 with equal probability. For quantifiably imperfect preparation and measurement, many other outcomes may occur with non-zero probability. One can estimate the probability of a specified quantity of the measurements being different from the ideal state measurement (e.g. one can estimate the probability of more than 10% of all samples being outside the set {00 . . . 0, 11 . . . 1} for a GHZ-type state). In some cases, one can estimate the full distribution of outcomes when the QPU is known to be in a good state. With this knowledge, statistical tests can be defined for testing later samples, to determine whether these are more likely to sample a different distribution with very high probability. The same can be done for arbitrary other entangling quantum circuits; the GHZ state is a special case in that a single faulty or misaligned receiver subsystem (part of the classical control hardware) will have a strong error signature, namely, the outcomes for the bits received by this subsystem will appear uncorrelated with the outcomes of the remaining bits.

At 212, the figures of merit are evaluated against one or more criteria. For instance, the figure of merit may be compared with a threshold. As an example, parity operators $Z_{[i,j,\ldots k,l]} := Z_i Z_j \ldots Z_k Z_l$ can be used to quantify correlations which, for any even length subset of qubit labels $\{0<=i<j<\ldots<k<l<=Q\}$, for a prepared GHZ state and good readout fidelities, should have a very small probability of yielding a negative parity outcome in any single shot experiment:

$$p_{[i,j,\ldots k]}^- := P(Z^{[i,j,\ldots k,l]} = -1^{1+|\{i,j,\ldots,k\}|}) \ll 1.$$

For a given large number N>>1 of repeated state preparations and subsequent measurements (e.g., N on the order of tens, hundreds, thousands or more), the fraction of negative parity outcomes can be computed as $$f_{[i,j,\ldots k,l]} := \frac{N(Z_{[i,j,\ldots k,l]} = -1 | N \text{ trials})}{N}.$$

Using Hoeffding's inequality or more generally Markov's inequality, we can formulate statistical tests for empirically sampled outcomes of that will allow us to positively identify faults with pre-specified probability. Outcomes for $f_{[i,j,\ldots k,l]}$ for different choices of the qubit subsets {i, j, . . . k, l} can be obtained from the same experimental trials. This then allows us to identify which readout line(s) might be corrupted by identifying the common qubits to all the subsets {i, j, . . . k, l} for which fraction of parity violations exceed the threshold given by one of the above probabilistic bounds.

In the example shown, one or more criteria are used to determine whether the figures of merit indicate unacceptable levels of error in the output state at 212. If the figure of merit satisfies the criteria at 212, the process 200 proceeds to 214.

If the figure of merit violates the criteria, the process 200 proceeds to 216 or 218 or both.

At 214, data are certified. For example, if the measurement correlations meet the criteria at 212, data previously produced by the QPU can be certified as accurate or designated in another manner. In some cases, all data produced by the QPU since the most recent prior QPU test can be certified, although, a suitable timeframe within which data can be certified as accurate can in some embodiments be based on an empirical understanding of the mean time between hardware failures Consider an example of three qubits and the parity operators $Z_{[1,2]}=Z_1Z_2$ or $Z_{[1,3]}Z_1Z_3$. For a three qubit GHZ state with perfect readout, measurement of these parity operators should always yield a positive outcome +1. Preparation error and readout imperfection can lead to a non-zero but small expected negative outcome fraction $\bar{f}_{[1,2]} \ll 1$ or $\bar{f}_{[1,3]} \ll 1$. Hoeffding's inequality then guarantees that the probability of observing a fraction is given by $P(f_{[1,2]} > t := \bar{f}_{[1,2]} + \epsilon) \leq \exp(-2\epsilon^2 N)$, which depends exponentially on the number of samples. One can therefore fix some threshold $t_{[1,2]} := \bar{f}_{[1,2]} + \epsilon$ and then choose N large enough such that $\exp(-2\epsilon^2 N)$ is small enough to lead to a negligible rate of false positives.

At 216, corrupt data are identified, if present. For example, if the measurement correlations violate the criteria at 212, data previously produced by the QPU can be decertified as inaccurate or designated in another manner. In some cases, all data produced by the QPU since the most recent prior QPU test can be decertified, deleted, or handled in another manner. In some cases, a server or access node is notified of potentially unreliable data or a time period for which the QPU's output data may be unreliable.

At 218, errors are diagnosed, and in some cases, system components are recalibrated. In some implementations, the qubits contributing to correlations that violate the criteria described above are identified as candidates for having a faulty control subsystem. Single qubit measurements (such as Rabi experiments) can be executed to investigate whether single qubit coherent control is still functional. Parallel single qubit experiments (multi qubit experiments but without intentional entangling gates) can also be executed to verify whether these behave like sequential single qubit experiments. If this is also the case, the original failure may be found in the shot-by-shot sample alignment of readout data from readout subsystems for different qubits. If this is not the case, then there may be unexpected cross-talk between single qubit control or readout operations which can be further analyzed. If even isolated single qubit control experiments fail for a qubit that was proven functional at an earlier time, it may be likely that the control system for generating pulses or sampling the readout has failed. In some cases, metastable quasiparticles in the superconducting elements of the processor can affect individual qubit performance intermittently and there exist specific protocols to identify these, as well. For example, signal hardware components of the QPU or other components of the QPU may be tested for faults or analyzed for noise sources. In some instances, components can be replaced, repaired or modified to remove faults. In some instances, the QPU may be recalibrated to adjust for drift or other noise sources.

In some embodiments, a method for identifying the presence of faults in a quantum computing system may comprise: defining a test domain in the quantum computing system, the test domain comprising a set of qubits and corresponding classical control hardware; defining a target distribution over measured bit patterns for the test domain; producing a control sequence, configured to generate the target distribution; executing the control sequence on the set of qubits and corresponding classical control hardware to produce an output of bit patterns in the test domain; recording the output bit patterns; repeating the executing and recording; calculating correlations between the output bit patterns to generate at least one figure of merit; and evaluating the at least one figure of merit to determine the likelihood of the presence of one or more faults.

Some of the subject matter and operations described in this specification can be implemented in digital electronic circuitry or quantum processor circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media.

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a classical computer, a quantum computer, a hybrid quantum/classical computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit), quantum information processing circuitry, or other types of systems.

Processors suitable for the execution of a computer program include, by way of example, both general and special purpose microprocessors, quantum information processors, and processors of any kind of digital or quantum computer. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device. Devices suitable for storing computer program instructions and data include all forms of non-volatile memory, media and memory devices, including by way of example quantum memory systems, semiconductor memory devices (e.g., EPROM, EEPROM, flash memory devices, and others), etc. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending data to and receiving data from a device that is used by the user; for example, by exchanging network packets with the device.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect, a hardware test is executed in a quantum computing system.

In some aspects, a computer system receives a computer program to be executed in a computing environment. The computer program includes an instruction to perform a hardware test. The computer system identifies a quantum computing resource and instructs the quantum computing resource to perform the hardware test. In response, the computer system receives, from the quantum computing resource, an outcome of the hardware test.

Implementations of these and other aspects may include one or more of the following features. The computing environment can be a remotely-accessible (e.g., "cloud-based" or otherwise) computing environment, and the computer system can receive the computer program from a remote access node. The remotely-accessible computing environment can have a quantum machine instruction library that includes an instruction set for the hardware test. The hardware test can be exposed to the remote access node, for example, as an application programming interface (API). The instruction in the computer program can be, or include, a function call or command that invokes the API.

Implementations of these and other aspects may include one or more of the following features. The hardware test includes generating a control sequence to produce an entangled state (e.g., a Greenberger-Horne-Zeilinger (GHZ) state or another entangled state) over two or more qubits in a quantum processor unit (QPU). The control sequence is executed iteratively by the QPU, and output states of the QPU are measured upon each iteration. Measurement correlations of the output state are analyzed to detect noise or faults in the QPU.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method for identifying a presence of one or more faults in a quantum processor cell of a hybrid computing environment, the hybrid computing environment comprising classical control hardware, a classical processor coupled to the classical control hardware, and the quantum processor cell, the method comprising:

by operation of the classical processor,
defining a test domain in the hybrid computing environment, the test domain comprising a set of qubits of the quantum processor cell and corresponding classical control hardware;
defining a target distribution over measured bit patterns for the test domain;
producing a control sequence, configured to generate the target distribution;
executing the control sequence on the set of qubits and the corresponding classical control hardware to produce output bit patterns in the test domain;

recording the output bit patterns;
repeating the executing and recording;
calculating correlations between the output bit patterns to generate at least one figure of merit; and
evaluating the at least one figure of merit to determine a likelihood of the presence of one or more faults.

2. The method of claim 1, wherein the test domain comprises a subset of the set of qubits and corresponding classical control hardware.

3. The method of claim 1, wherein the target distribution is given by multiple measurement bit patterns obtained for an entangled state in the test domain.

4. The method of claim 3, wherein the entangled state is a Greenberger-Horne-Zeilinger (GHZ)-type state.

5. The method of claim 1, wherein the target distribution allows for performing Bell tests of the qubits in the test domain.

6. The method of claim 1, wherein the control sequence includes digital control information for execution on the classical control hardware.

7. The method of claim 1, wherein the measured bit patterns are obtained by measuring one or more of the qubits in the test domain.

8. The method of claim 1, wherein the calculating correlations includes computing statistical correlations between the output bit patterns, wherein the at least one figure of merit is obtained by comparing the correlations of the output bit patterns with the correlations of an ideally prepared target distribution.

9. The method of claim 1, further comprising:
evaluating one or more of the at least one figure of merit against a criterion; and
reporting a fault if the at least one figure of merit does not meet the criterion.

10. The method of claim 9, further comprising, if a fault is reported, conducting a recalibration of the hybrid computing environment.

11. The method of claim 9, further comprising, if a fault is reported, subdividing the test domain to better determine where the fault originated.

12. The method of claim 1, further comprising:
evaluating the at least one figure of merit against a criterion; and
decertifying data produced by the hybrid computing environment since a most recent prior hybrid computing environment test if the at least one figure of merit does not meet the criterion.

13. The method of claim 1, further comprising:
evaluating the at least one figure of merit against a criterion; and
certifying data produced by the hybrid computing environment within a timeframe as accurate if the at least one figure of merit meets the criterion.

14. The method of claim 1, wherein the calculating correlations includes computing statistical correlations between the output bit patterns, wherein the at least one figure of merit is obtained by comparing the correlations of the output bit patterns with the correlations of a target distribution for a system known to be operating correctly.

15. The method of claim 1, wherein the method for identifying the presence of faults in the hybrid computing environment is run in parallel with user-submitted hybrid computing programs on the quantum processor cell.

16. The method of claim 1, wherein the method for identifying the presence of faults in the hybrid computing environment is run interleaved with user-submitted hybrid computing programs on the quantum processor cell.

17. The method of claim 1, wherein the method for identifying the presence of faults in the hybrid computing environment is incorporated in a user-submitted hybrid computing program.

18. The method of claim 1, comprising:
performing repeated Ramsey measurements for detection of changes in electromagnetic environment of the quantum processor cell that lead to shifts of qubit transition frequencies or decreased coherence times.

19. A hybrid computing environment, comprising:
a quantum processor cell comprising a plurality of qubit devices;
classical control hardware comprising controllers and signal hardware coupled to the quantum processor cell for operating components in the quantum processor cell; and
a classical processor coupled to the classical control hardware and configured to perform operations, comprising;
defining a test domain in the quantum processor cell, the test domain comprising a set of qubits in the quantum processor cell and corresponding components of the classical control hardware;
defining a target distribution over measured bit patterns for the test domain;
producing a control sequence, configured to generate the target distribution;
executing the control sequence to produce output bit patterns in the test domain of the quantum processor cell;
recording the output bit patterns;
repeating the executing and recording;
calculating correlations between the output bit patterns to generate at least one figure of merit; and
evaluating the at least one figure of merit to determine a likelihood of a presence of one or more faults.

20. The hybrid computing environment of claim 19, wherein the classical processor is located on a host server of the hybrid computing environment.

21. The hybrid computing environment of claim 19, wherein the classical processor is located on an access node of the hybrid computing environment.

22. The hybrid computing environment of claim 19, wherein the classical processor is a component of the classical control hardware.

23. The hybrid computing environment of claim 19, wherein the operations comprise:
performing repeated Ramsey measurements for detection of changes in electromagnetic environment of the quantum processor cell that lead to shifts of qubit transition frequencies or decreased coherence times.

* * * * *

UNITED STATES PATENT AND TRADEMARK OFFICE
CERTIFICATE OF CORRECTION

PATENT NO. : 11,740,984 B1
APPLICATION NO. : 17/121150
DATED : August 29, 2023
INVENTOR(S) : Nikolas Anton Tezak et al.

It is certified that error appears in the above-identified patent and that said Letters Patent is hereby corrected as shown below:

In the Specification

In Cross-Reference to Related Applications

Column 1, Line 9 Delete "System.""" and insert -- System," -- therefor

In Detailed Description

Column 14, Lines 43-44 Delete "$p_{[i,j,...k]} := P(Z_{[i,j,...k,l]} = -1^{1+|\{i,j,...,k\}|}) \ll 1.$" and insert -- $p_{[i,j,...k]} := P(Z_{[i,j,...k,l]} = -1^{1+|\{i,j,...,k\}|}) \ll 1$ -- therefor Column 14, Line 56 After "outcomes of" insert --$f_{[i,j,...k,l]}$-- therefor Column 15, Line 12 Delete "$Z_{[1,2]}=Z_1Z_2$ or $Z_{[1,3]}Z_1Z_3$." and insert --$Z_{[1,2]} = Z_1Z_2$ or $Z_{[1,3]} = Z_1Z_3$-- therefor Signed and Sealed this
Nineteenth Day of March, 2024

*Katherine Kelly Vidal*
*Director of the United States Patent and Trademark Office*